Nov. 17, 1925.
L. B. MILLER
SILICA GLASS
Original Filed April 1, 1921
1,562,115
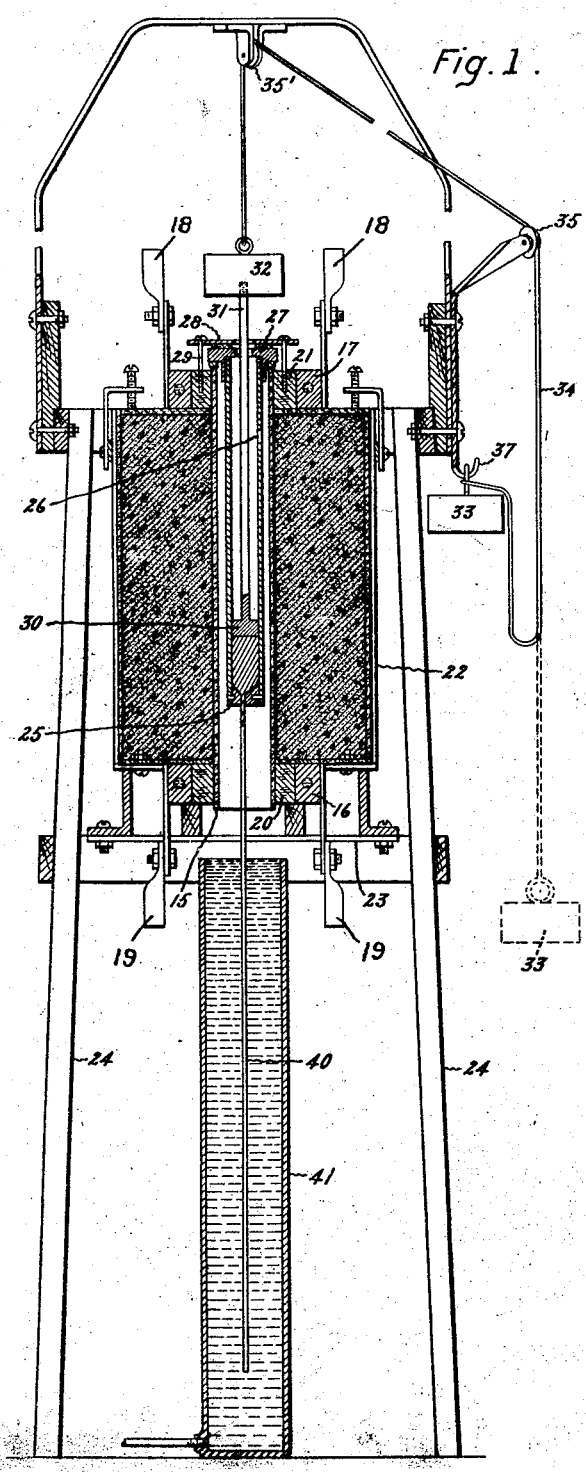
Inventor:
Levi B. Miller,
by *[signature]*
His Attorney Patented Nov. 17, 1925.

1,562,115

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

SILICA GLASS

Original application filed April 1, 1921, Serial No. 457,660. Divided and this application filed February 13, 1923. Serial No. 618,859.

*To all whom it may concern:*

Be it known that I, LEVI B. MILLER, a citizen of the United States, residing at Lynn, in the county of Essex, State of Massachusetts, have invented certain new and useful Improvements in Silica Glass (division of my application, Serial No. 457,660, filed April 1, 1921), of which the following is a specification.

My invention relates to the manufacture of transparent, substantially bubble-free silica glass, a material commonly also known as fused or amorphous quartz.

As described in Patent No. 1,536,821 of May 5, 1925, granted to Philip K. Devers, transparent silica glass may be made by fusing quartz, or other suitable form of pure silica, in a vacuum, and then compressing the mass while plastic to substantially eliminate the cavities which are formed in the fusion even when the silica is fused in a vacuum.

The present invention constitutes an apparatus adapted for the fabrication of vitreous silica whereby vacuum-fused silica is moulded in the presence of gas under substantial pressure to a desired form, for example, by extruding the plastic glass from the heating zone directly into the atmosphere. The present invention comprises in particular a furnace for carrying out the extrusion process which is claimed in my copending divisional application Serial No. 457,660, filed April 1, 1921. The novel features of my invention will be pointed out with particularity in the appended claims.

Among the advantages secured by my invention are the easy accessibility of the heating zone, the delivery of the shaped silica into the open where it may be chilled to prevent deformation, the utilization of a cheap material such as graphite, as a container for fusions of silica, and the provision of apparatus for producing directly from plastic silica, shaped articles, such as tubes, which are transparent and substantially free from bubbles.

For a complete understanding of my invention, reference may be had to the following description taken in connection with the accompanying drawings in which Fig. 1 is a vertical section of a furnace having a heating chamber open to the atmosphere and being provided with means for extruding vacuum-fused quartz under pressure; Figs. 2 and 3 are detail sectional views of a die suitable for extruding tubes of quartz.

In carrying out my invention as a preliminary step, a suitable form of silica, for example, crystalline quartz, is fused in a good vacuum in accordance with the procedure described in the above Devers patent. The resulting slug of vitreous or glassy silica is transferred to a furnace such as shown in Fig. 1.

This furnace provides a heating space which is open to the atmosphere so that the vitreous silica in its plastic state is not only acted upon by atmospheric pressure, but can be extruded through a discharge port at the bottom of the furnace into a working space beneath the furnace, thereby aiding the operator when carrying out the process. The furnace comprises a heater 15, which for example, may consist of a carbon tube connected at opposite ends to water cooled terminals 16, 17, to which are connected electric conductors 18, 19. Carbon or graphite rings 20, 21, preferably are placed between the tube 15 and the terminals 16, 17, which may consist of copper. The carbon tube is surrounded by a packing of charcoal or other suitable heat insulating material contained within a receptacle 22, which conveniently consists of asbestos.

The furnace is supported at a considerable height upon a platform 23, the upper end of the furnace as well as the platform 23 being connected to uprights 24. Within the heater 15 is a graphite crucible 25 which projects through the upper part of the furnace. The interior of the crucible 25 communicates with the heating space through a vent hole 26. The space between the graphite crucible 25 and the heater tube 15 is closed by a cap 27 consisting of graphite or other suitable material suitably connected to the ring 21 by a plate 28 with screws 29, asbestos insulating rings being provided both between the cap 27 and the tube 15, and between the cap 27 and the plate 28. Fitting into the graphite crucible 15 is a graphite piston 30 connected to a rod 31 at the upper end of which is carried a weight 32. This weight may be counterbalanced by another weight 33 (when in the position shown by dotted lines). The two weights are attached to a flexible cable 34 passing over the pulleys 35, 35'. As shown in Fig. 1, the bottom of the crucible is provided with an extrusion opening or a die, as will be hereinafter more fully explained.

Before the furnace is put into operation and before a charge of silica is placed therein the parts of the furnace subject to heating, which consist entirely of carbon, are purified by making a blank run at or slightly above the operating temperature. Preferably the graphite crucible, the piston and the die if used as later described, are fired in a vacuum to about 2000° C. or over, before assembling the furnace. By thus volatilizing mineral matter from the crucible and other furnace members which come into direct contact with the fused silica or are located closely adjacent the silica charge, it is possible to obtain a clear, uncontaminated fusion even at the high temperatures employed. Former attempts to fuse silica in carbon containers resulted in a cloudy or even opaque product. I have found that this contamination of the silica was not due to chemical combination of the silica and the carbon, but was due to mineral impurities in the carbon which dissolved in the silica. Some chemical reaction between the silica and the carbon appears to occur at high temperature and carbon monoxide gas is produced which soon fills up the furnace interior and prevents access of air.

In any event, pure clear vitreous silica may be produced in apparatus prepared in accordance with my invention.

When the furnace parts have been purified, a mass of vacuum-fused silica prepared as above described, is placed in the crucible 25 and the furnace is brought up to the operating temperature of about 1750° C. As the space within the heater tube 15 is closed at the top, air is soon excluded by the heated carbon monoxide gas generated within the furnace. Pressure is exerted upon the mass of silica when plastic, for example, by lifting the counterbalancing weight 33 and placing it upon hook 37 (as shown in full lines), thereby causing the full force of the weight 32, which may weigh 30 to 35 pounds, or more, to be exerted through the graphite piston through the mass of silica, the cross-section of which may consist of about 1 to 3 sq. in. As already indicated, when the temperature of the silica glass reaches about 1700 to 1750° C. the pressure exerted thereupon very largely, or even entirely, eliminates bubbles and produces a clear glassy mass.

I prefer, in accordance with my invention, to utilize the pressure upon the fused silica glass, not only to eliminate bubbles, but to shape the glass into suitable form such as cane or tubes. As shown in Fig. 1, the bottom of the crucible 25 is provided with a perforation through which may be extruded a rod or cane of silica glass 40, as shown in the drawing. In order to prevent deformation of the cane, it is preferably extruded directly into a cooling liquid, for example, water, contained in the receptacle 41. The water not only cools the cane but also counterbalances the weight of the cane in part thereby preventing the weight of the cane extruded from the crucible from acting cumulatively upon the still plastic silica as it issues from the crucible, or in other words, to prevent the weight of the suspended mass from decreasing the diameter of the extruded cane.

I have shown in Figs. 2 and 3 a suitable die for making quartz tubing. In this case the bottom of the crucible is provided with an annular opening. The core 42, consisting of graphite, is connected to the side of the crucible 25 by a right-angled offset section 43 removed a sufficient distance from the end of the tube to permit the plastic quartz to flow past the section 43 and then to reunite upon entering the throat of the circular extrusion opening between the core 42 and the reinforced end wall 44 of the crucible. Preferably the core 42 is made tubular and a hollow core communicates with the atmosphere to permit of the discharge of gases generated in the interior of the extruded tube 45, thereby maintaining the tube at substantially uniform diameter.

What I claim as new and desire to secure by Letters Patent of the United States, is:—

1. An electric furnace adapted for shaping plastic silica which comprises a container providing a vertical heating zone having a discharge port located at its lower end, an electric heater therefor, a refractory crucible supported in said heating zone and having a die aligned with said discharge port to permit of the extrusion of material therethrough and means for extruding a charge from said refractory container.

2. An electric furnace comprising a container having an opening at the bottom, a refractory crucible supported therein and provided with an annular orifice for the discharge of material, means for supporting said container at the upper end only with said orifice in line with said opening to permit expulsion of material from said orifice, means for heating said crucible by radiation, and means for expelling a charge in said container through said orifice.

3. An apparatus for shaping silica glass comprising a receptacle for said glass provided with an extrusion opening, means for heating said glass to the plastic state and a receptacle containing a body of liquid located to receive extruded silica.

4. An apparatus for making quartz tubing comprising a refractory crucible having a die opening, a core located in said opening and supported at a place removed from said opening, said core being provided with a duct communicating with the exterior, means for heating said crucible and means for subjecting a charge in said crucible to pressure.

5. A quartz working apparatus comprising a carbonaceous container provided with a die opening, a piston of carbonaceous material having a cross-section substantially equal to the bore of said container, means for heating a charge in said crucible and means for applying pressure upon said piston to extrude the charge when in a plastic condition through said die opening.

6. An electric furnace adapted for the extrusion of fused quartz comprising a tubular refractory heater, electrodes at opposite ends of said heater, a closure for the upper end of said heater the opposite end being open, a refractory crucible having a die opening and being supported from said closure, an elevated support for said heater providing a working space beneath said heater and means for extruding a charge in said crucible through the die opening into the working space beneath said heater.

In witness whereof, I have hereunto set my hand this 5th day of February, 1923.

LEVI B. MILLER.